(12) United States Patent
Sjödin et al.

(10) Patent No.: US 8,291,937 B2
(45) Date of Patent: Oct. 23, 2012

(54) ACCUMULATOR MEMBRANE UNIT, METHOD FOR PRODUCTION THEREOF AND ROCK DRILLING MACHINE INCLUDING SUCH AN ACCUMULATOR MEMBRANE UNIT

(75) Inventors: Gunnar Sjödin, Karlskoga (SE); Maria Pettersson, Stora Mellösa (SE); Peder Haraldsson, Örebro (SE); Magnus Walter, Örebro (SE); Lennart Donsé, Åkersberga (SE); Per-Erik Larsson, Örebro (SE)

(73) Assignee: Atlas Copco Rock Drills AB, Orebro (SE)

( * ) Notice: Subject to any disclaimer, the term of this patent is extended or adjusted under 35 U.S.C. 154(b) by 0 days.

(21) Appl. No.: 12/998,729

(22) PCT Filed: Dec. 4, 2009

(86) PCT No.: PCT/SE2009/000509
§ 371 (c)(1),
(2), (4) Date: May 24, 2011

(87) PCT Pub. No.: WO2010/077199
PCT Pub. Date: Jul. 8, 2010

(65) Prior Publication Data
US 2011/0220419 A1    Sep. 15, 2011

(30) Foreign Application Priority Data

Dec. 29, 2008  (SE) ........................... 0802672

(51) Int. Cl.
*F16L 55/04* (2006.01)
(52) U.S. Cl. ............................... 138/30; 138/26
(58) Field of Classification Search ............. 138/30, 138/26
See application file for complete search history.

(56) References Cited

U.S. PATENT DOCUMENTS

| 3,601,128 A * | 8/1971 | Hakim ........................... 604/9 |
| 2004/0065374 A1 * | 4/2004 | Baltes et al. ..................... 138/30 |

FOREIGN PATENT DOCUMENTS

| DE | 102006014456 A1 | 10/2007 |
| GB | 1108551 A | 4/1968 |
| GB | 1194764 A | 6/1970 |
| GB | 2019939 A | 11/1979 |
| JP | 8326702 A | 12/1996 |
| JP | 9133101 A | 5/1997 |
| WO | WO 2004/013495 A1 | 2/2004 |
| WO | WO 2004/020155 A1 | 3/2004 |

* cited by examiner

*Primary Examiner* — Patrick F Brinson
(74) *Attorney, Agent, or Firm* — Mark P. Stone (57) ABSTRACT

An accumulator membrane unit (2) for inclusion into an accumulator chamber (6) in an accumulator (1) for storing hydraulic energy under pressure. The accumulator membrane unit includes membrane elements (3) that are sealingly joined at their peripheries and limit an inside membrane volume (V) which varies in dependence of a pressure at an outside of the accumulator membrane unit. The invention also concerns an accumulator, a method and a rock drilling machine.

20 Claims, 6 Drawing Sheets

ACCUMULATOR MEMBRANE UNIT, METHOD FOR PRODUCTION THEREOF AND ROCK DRILLING MACHINE INCLUDING SUCH AN ACCUMULATOR MEMBRANE UNIT

FIELD OF THE INVENTION

The invention relates to an accumulator membrane unit according to the preamble of claim 1. The invention also relates to an accumulator for storing energy through a hydraulic medium under pressure, a method for the production of an accumulator membrane unit and a rock drilling machine.

BACKGROUND OF THE INVENTION

From GB 2 019 939 A is previously known a pressure vessel for e.g. damping pressure pulses or for storing of energy in a hydraulic system. Inside a closed housing which is filled with gas under high pressure there are positioned a plurality of membrane units, each one consisting of two circular metal membranes which are welded together at their outer peripheries in order to form a cavity. The cavity is in turn connected to a supply conduit for pressure medium.

If the fluid pressure in the hydraulic system exceeds the gas pressure in the pressure vessel, the pressure medium is pressed into the cavities, whereupon the membranes expand against the action of the gas pressure. If the liquid pressure in the hydraulic system falls below the gas pressure, the membranes are pressed together such that fluid from the cavities is pressed back to the hydraulic system.

GB 1 108 551 concerns a pressure accumulator for hydraulic liquid, wherein a part of the accumulator containing a gas is divided by a perforated baffel wall limiting the deflection of the membrane.

Known devices within the field are not reliable during long term use under demanding conditions, since the hitherto used accumulator devices risk failing at high varying pressures.

MOST IMPORTANT FEATURES OF THE INVENTION

It is an aim of the present invention to provide an accumulator membrane unit as mentioned initially which is an improvement in respect of the background art in respect of operational security and manufacturing friendliness.

It is also an aim to provide a method for producing an accumulator membrane unit, an accumulator and a rock drilling machine, wherein the problems of the background art at least is reduced.

These aims are obtained by an accumulator membrane unit, a method, an accumulator and rock drilling machine as above through the features of the independent claims.

Concerning the inventive accumulator membrane unit, hereby is achieved that pressurizing with an over-pressure of hydraulic medium on the outside of the accumulator membrane unit tends to flatten the unit through elastic deformation of the unit such that from a convex state it will more and more assume a flat state as a response to an increasing pressure.

This results on the one hand in the advantage that the elastic properties of the material in the membrane elements can be used in an very advantageous way since the stored energy can be received essentially without losses, whereby i.a. the heat development is avoided which will otherwise occur when the corresponding work is preformed essentially through compressing and expanding a gas volume. According to the invention it is thus the elastic deformation of the material in the membrane elements themselves during pressurizing the outside of the accumulator membrane unit, and transforming the work required for performing this elastic deformation into elastic energy stored in the membrane material itself, that results in the inventive storing of energy. During reduced pressurizing of the outside of the accumulator membrane unit, the stored elastic energy will be recovered in the form of hydraulic energy.

A great advantage of the invention in respect of the background art is that when a membrane unit has been compressed, at a certain pressure level, further increased pressure will not result in any damage to the accumulator membrane unit, since the membrane unit already is in a stable final state (essentially flat). This results in that an accumulator according to the invention can be made very resilient against load, and a long working life can be expected for devices according to the invention. Further, conventional accumulators have to be charged and recharged whereas an accumulator device according to the invention can be made maintenance free.

It can be noted that the accumulator membrane unit firstly because of its shape and size as well as thickness and material properties of the membrane elements, and also to a certain extent by possible contents or lack of contents of gas, can be adapted such that the unit is given a desired characteristic in respect of working point and operating range. With working point is here intended a pressure point or a pressure value, when the energy storing of the unit starts and with operating range between which pressure values the unit works.

The membrane units are manufactured from a stiff, but elastically deformable material. Further, the membrane elements are formed by an elastically deformable material in such a way that the membrane units are elastically deformable by pressurizing with an increasing hydraulic pressure of the accumulator membrane unit, whereby hydraulic energy can be stored as elastic deformation work in the membrane elements.

The membrane elements are thus energy absorbing and hereby serve as a form of springs, that spring inwards during increased surrounding pressure and springs outwards at reduced surrounding pressure in an essentially reversible process.

In particular, the accumulator unit forms a convex body in a state where it is not pressurized from the outside.

Suitably, the accumulator membrane unit is lens-shaped and circular in a non pressurized state and preferably the accumulator membrane unit limits a closed membrane volume. It is, however, not excluded that the enclosed membrane unit communicates over a conduit with a pressure source outside the accumulator or even with the atmosphere. Further, it is preferred that each accumulator membrane unit is formed from two identically shaped membrane elements, whereby it has a symmetry plane, against which the membrane units preferably adjoin tangentially, in the area where the membrane units are joined together.

According to the invention, in order to achieve suitable desired properties of a resulting accumulator, the membrane unit contains anyone from the group: a gas under pressure, a gas of atmospheric pressure, essentially no gas, vacuum.

I order to obtain the properties being desired for the accumulator membrane unit, the membrane elements according to the invention are manufactured from material having an E-module of between about 70 and 2000 GPa. Suitably any one or more materials from the group: steel, spring steel, aluminium, alloys of aluminium, titanium, alloys of titanium, composite material, polymeric material, fibre reinforced (preferably carbon fibre reinforced) polymeric material comes into question.

By the membrane units having a greater thickness centrally than peripherally, increased security against incorrect curving of the unit after having been flat is achieved.

The membrane elements suitably have a curvature of between about 1 and 15% of a diameter of the membrane units, wherein a curvature between about 5 and 13% of the diameter of the membrane units is preferred.

The membrane units are preferably joined together through anyone from the group: welding, soldering, clamping with an intermediate seal, gluing.

When the membrane units are joined together through welding it is preferred that a weld joint being directed radially outwardly, so as to join the membrane units, is applied surrounding the accumulator membrane unit.

An inventive accumulator for storing energy by means of hydraulic medium under pressure includes a housing having a sealed connection for said hydraulic medium. It preferably provides a positioning device for said at least one accumulator membrane unit which includes clamping rings having axial and radial directions for spacing of the respective accumulator membrane unit from walls of the housing and, at occasions, sideward arranged membrane unit(s). Said clamping rings preferably have axially directed recesses for the cooperation with a peripheral region of each accumulator membrane unit. Further, said clamping rings preferably have at least one radial passage for hydraulic medium. The clamping rings preferably allow radial expansion during pressing together of the accumulator membrane units.

In a particular aspect of the invention, in one and the same accumulator there are include a plurality of accumulator membrane units with different working points ($P_1, P_2 \ldots P_n$) and operating ranges ($\Delta P_1, \Delta P_2 \ldots \Delta P_n$), where n is an integer exceeding 2, such that with one and the same accumulator, a plurality of working points and operating ranges can be realized.

The corresponding advantages are achieved in an inventive method. In a preferred inventive aspect there is applied a radially outwardly directed weld joint surrounding the accumulator member unit and joining the membrane elements by the two, in unpressurized state curved membrane elements being placed for forming a lens shape, the membrane elements being pressed together through a pressing device to an essentially flat state and the membrane elements being joined together in this compressed state. When the pressing device subsequently is deactivated and the membrane units thereupon are allowed to assume there curved shapes, near vacuum will prevail inside the formed membrane volume.

Preferably identically shaped membrane units are joined together with the membrane units adjoining tangentially to a symmetry plane in the area where they are joined. As required, the membrane volume (V) is supplied with anyone from the group: a gas under pressure, a gas under atmospheric pressure, vacuum.

Further features and advantages of the invention will be evident from the following description of embodiments with reference to the annexed drawings.

DESCRIPTION OF EMBODIMENTS

Like and similar parts may in the different embodiments have been references with the same reference numbers.

Figure 1:
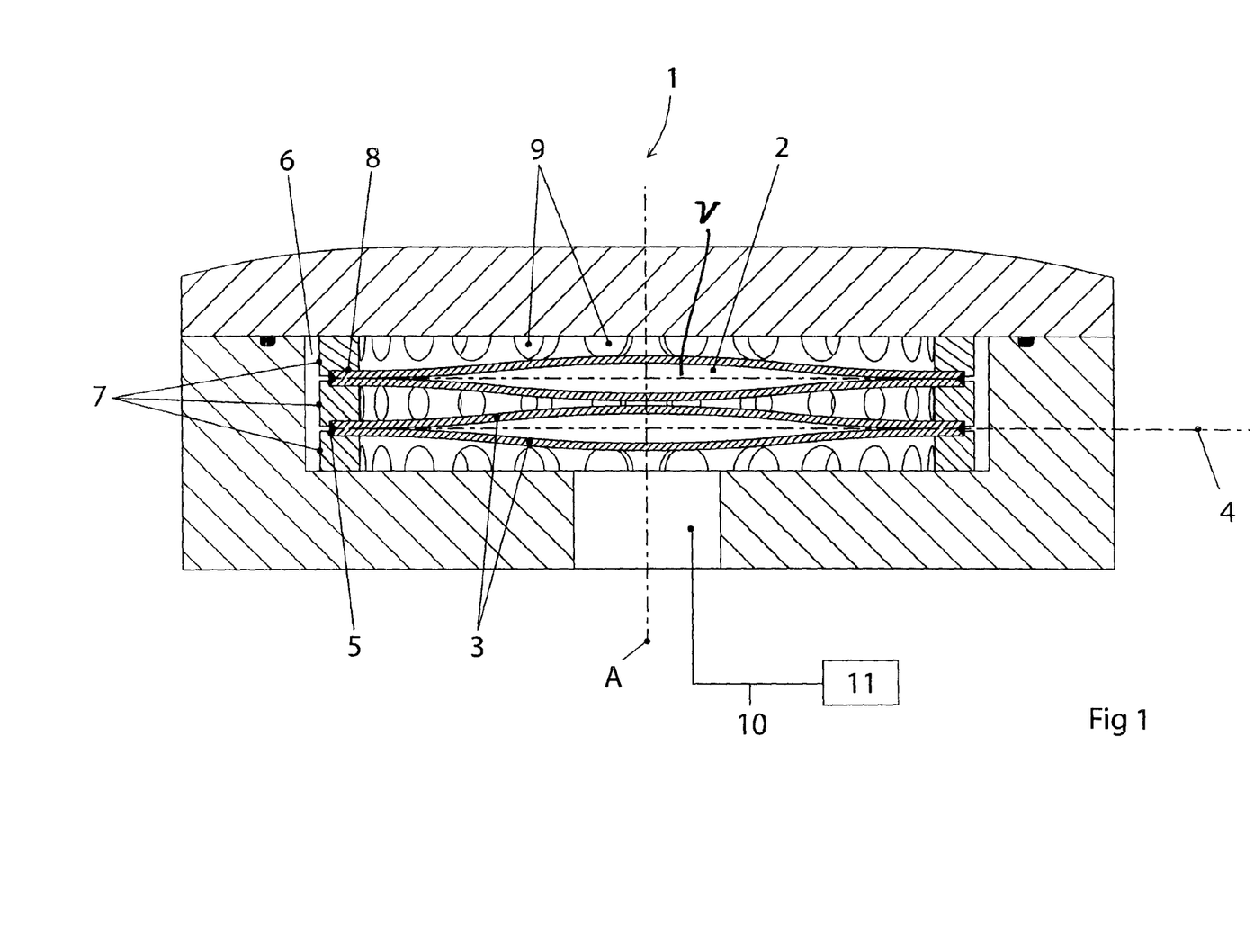
FIG. 1 shows in an axial section an accumulator according to the invention.

The accumulator shown in FIG. 1 includes a housing, which is comprised of a main part and a sealingly applied lid, together encasing a sealed accumulator chamber 6, which sealingly communicates over a connection for hydraulic medium 10 with an external hydraulic circuit 11. The external hydraulic circuit can preferably be included in a hydraulic system of a rock drilling machine.

In the accumulator chamber 6 there are included two counter-pressure units in the form of accumulator membrane units 2, each consisting of two membrane elements 3 being vaulted in an unpressurized state, as is shown in the Figure. The membrane elements 3 are shown identical and are joined over a symmetry plane 4 (only one shown in the Figure) for forming an essentially lens-shaped accumulator membrane unit 2. The membrane elements 3 and the accumulator membrane units 2 are circular around a symmetry axis A and provide a peripheral edge region, wherein the membrane elements 3 lie essentially tangentially to each other and to the symmetry plane 4. Peripherally most outwardly, and directed radially outwardly, there is positioned a weld joint 5, which sealingly joins the two membrane elements 3 outermost at their peripheries for forming a unit having a membrane volume V being sealingly limited against the surroundings.

The accumulator membrane units 2 are positioned and placed in the accumulator chamber 3 by means of an arrangement of a positioning device being comprised of a number of clamping rings 7, which are dimensioned so as to with respective recesses 8 partly receive an edge portion of a respective accumulator membrane unit 2. The clamping rings 7 are preferably of a synthetic material which is inert against hydraulic medium introduced inside the accumulator chamber at temperatures that may prevail in the accumulator chamber 6.

The clamping rings 7 further have radial passages 9 allowing hydraulic medium freely to flow on all outside surfaces of accumulator membrane units 2 being positioned and fastened inside the accumulator chamber 6.

The connection 10 for hydraulic medium thus, according to the invention, communicates with a space inside the accumulator chamber 6, which space is outside the membrane volume of each accumulator membrane unit.

Figures 2A, 2B:
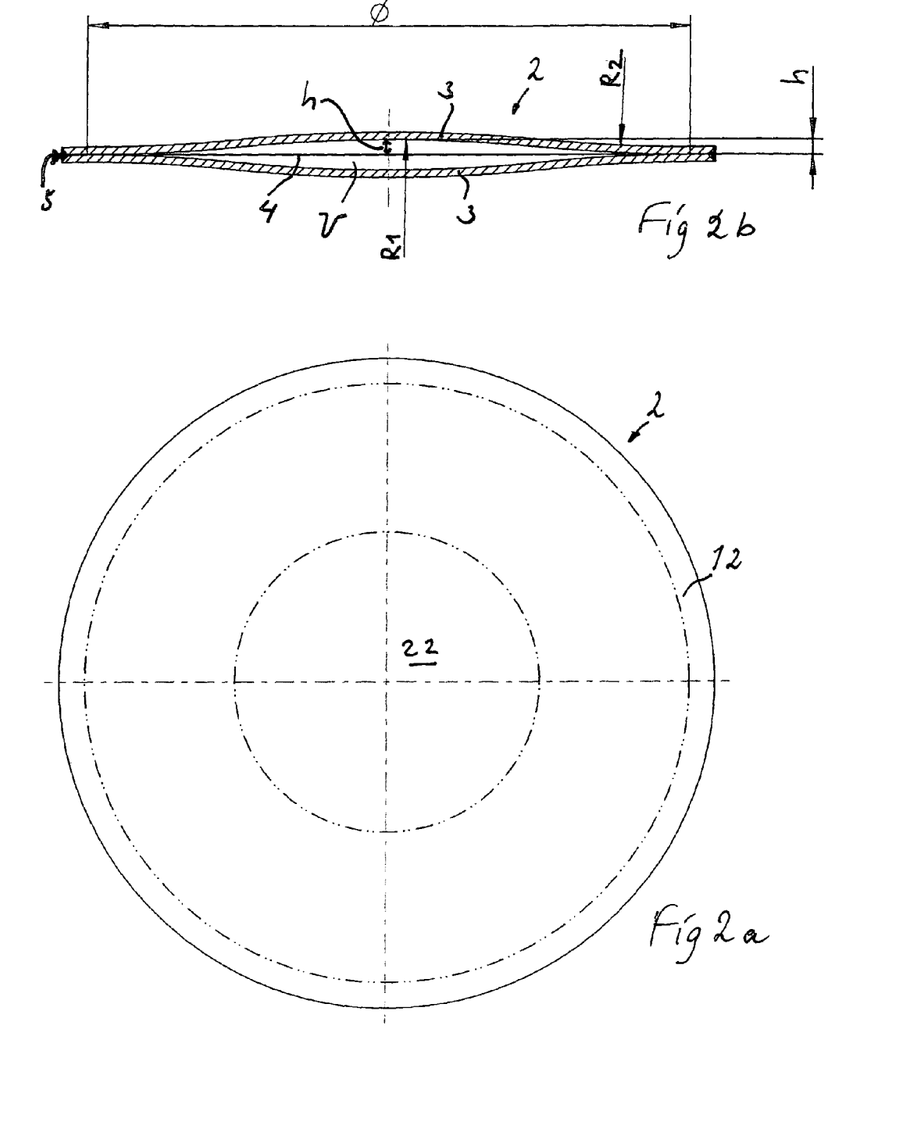
FIGS. 2*a* and 2*b* show diagrammatically an accumulator membrane unit according to the invention in a plane view and in axial section, respectively.

FIGS. 2*a* and 2*b* show an accumulator membrane unit, in FIG. 2*b* in a sectional view. The unit 2 shown in FIGS. 2*a* and 2*b* is shown with a curvature, wherein a central area 22 of the membrane elements 3 is curved having a radial curvature $R_1$, which as an example can be 200 mm for a unit having the diameter $\Phi$ of 120 mm. In the shown unit, the membrane elements are made from thin spring steel and vaulted to a height h of about 5 mm. 12 indicates a peripheral portion wherein the membrane units are joined together to each other. $R_2$ indicates a radius of curvature in this region.

In a variant of the invention, extra measures can be taken in order to prevent the unit from assuming an incorrect curvature after a complete compression and adapt in an undesired position, wherein the one of the membrane elements is curved inside the second membrane element such that a looked unit will result. The membrane elements can in such case in the central region be given a somewhat greater thickness which gives increased resistant against incorrect curving after compressing. Alternatively, minor distance protrusions can be arranged on the sides of the membrane elements facing each other.

Through the accumulator membrane units according to the invention, several advantages are obtained wherein can be mentioned that the elastic properties of the material can be used in an advantageous manner. That is since generation of heat during the elastic work of the material is very low, wherein an almost adiabatic process will result, i.e. without heat generation during compressing and expanding respectively of the unit. This is in particular true for steel and in particular for spring steel, said materials having low hysteresis and being preferred in connection with the invention.

This phenomenon is most accentuated in case of a membrane volume V being essentially free from gas to be compressed during compressing the accumulator unit 2.

In any case, work required for elastically compressing the very membrane elements will clearly dominate over the resistance from possibly contained gas inside the membrane volume V.

It is, however, not excluded that the membrane volume V has a gas contents and even a considerable overpressure over the atmospheric pressure. In that case, the compressing work will on the one hand depend on the shaping of the membrane material such as size, thickness, vault height etc. and the E-module of the material, on the other hand of the amount of gas to be compressed during compressing the unit. Also in respect of considerable amounts of gas inside the membrane volume, the heat development can therefore normally be completely acceptable in many applications and generated heat easily be led away and cooled off.

Figure 3:
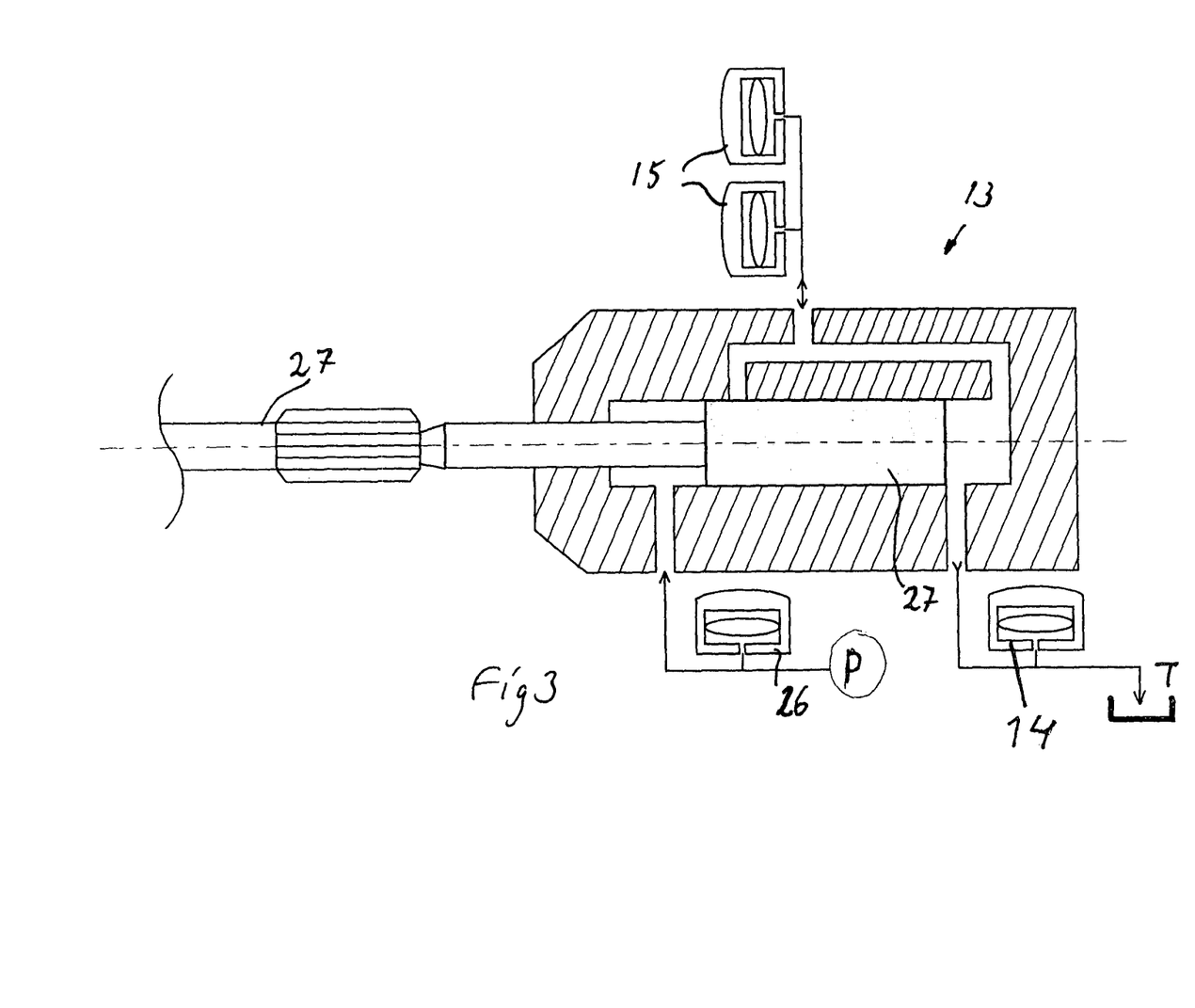
FIG. 3 shows diagrammatically a machine for working rock and being equipped with accumulators according to the invention.

In FIG. 3 is diagrammatically shown a percussion machine 13 with a piston 17, which can be a valve free percussion machine and which is connected to a pressure source P for hydraulic medium to its inlet and to a tank T for its discharge. Also connected to the machine 13 is a low pressure accumulator 14 and two high pressure accumulators 15. A supply accumulator is indicated with 26. A tool in the form of a drill steel is indicated with 27. Accumulators according to the invention are particularly suitable for application as low pressure accumulators 14.

The pressure characteristic of hydraulic systems wherein the invention is supplied can be varied. A working point $P_1$ and an operating range $\Delta P_1$ of a low pressure accumulator and a working point $P_2$ and an operating range $\Delta P_2$ of a high pressure accumulator is hereby chosen according to the requirements that prevail in the particular application.

Possibly only one, for example the low pressure accumulator, is an accumulator according to the invention whereas another can be of another type. It is to be understood that accumulator membrane units belonging to the respective accumulator are "unaffected" by pressure below level $P_1$ and $P_2$, respectively, and the actual accumulator work is in the intervals $\Delta P_1$ and $\Delta P_2$.

Through the shapes of the respective units, the thickness of the membrane elements and the material properties and also through possible contents or lack of contents of gas, the accumulators are adapted such that the units are given a desired characteristic in respect of working point $P_1$ and $P_2$ and operating range $\Delta P_1$ and $\Delta P_2$. Hereby the low pressure accumulator 14 can deliver hydraulic fluid during a return phase of the percussive device of the machine when the pressure level is relatively low and the high pressure accumulator 15 delivers hydraulic fluid during a forward phase of the percussive device of the machine when the pressure level is relatively high.

Figure 4:
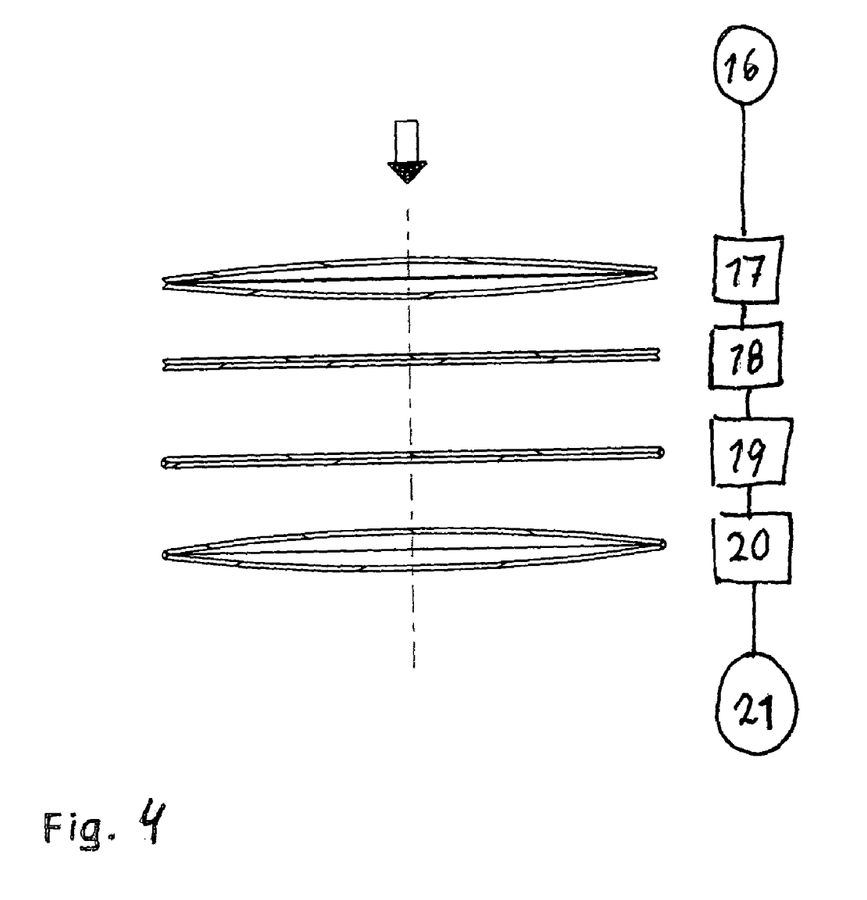
FIG. 4 shows diagrammatically a sequence over a method for the manufacture of an accumulator membrane unit according to the invention.

In FIG. 4 is diagrammatically illustrated a process for the production of an accumulator membrane unit according to the invention, wherein position 16 indicates the start of the sequence.

Position 17 represents providing of two steel membrane elements that are vaulted in an unaffected state and bringing them together for the forming of a lens-shape.

Position 18 indicates activation of a pressing device where the plane pressing plates having a dimension corresponding to the diameter of the membrane elements for pressing together the membrane elements to an essentially flat state and in such a way that an assembled edge region of both membrane elements is accessible radially at the outside of these pressing plates.

Position 19 indicates welding together of the membrane elements in the edge region such that there is formed a weld joint directed radially outwards, surrounding the accumulator membrane unit and sealing the same.

Position 20 indicates releasing the unit from the pressing device, whereby the unit will assume a lens-shape and the enclosed membrane volume V will be essentially free from gas (vacuum) or at least will contain gas of a low pressure and thereupon positioning of the formed unit inside an accumulator.

Position 21 indicates the end of the sequence.

Figure 5A:
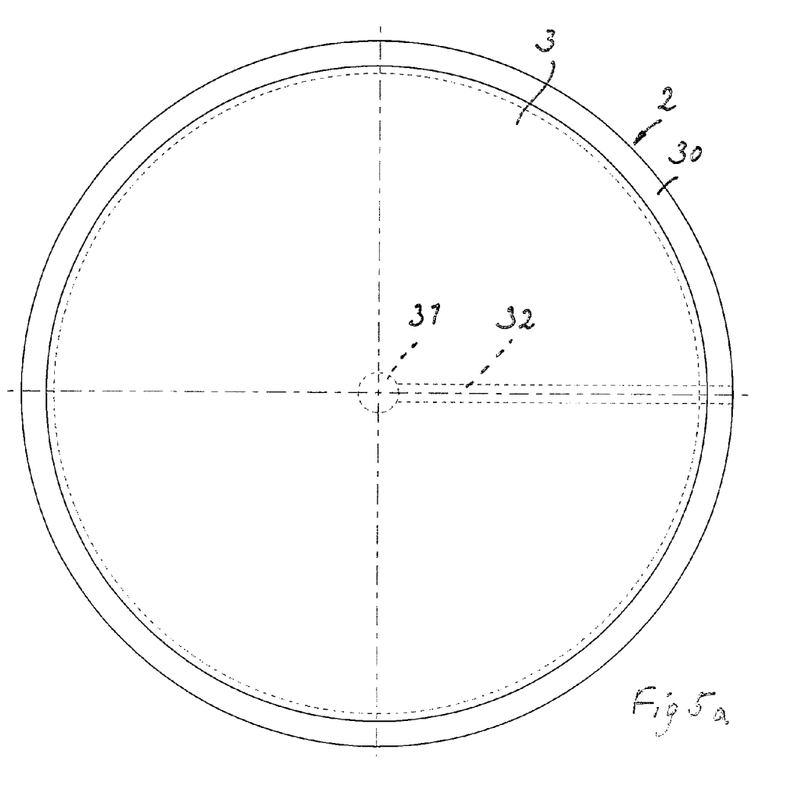
FIGS. 5*a* and 5*b* show diagrammatically an accumulator membrane unit according to a further embodiment of the invention in a plane view and in an axial section, respectively.
Figure 5B:
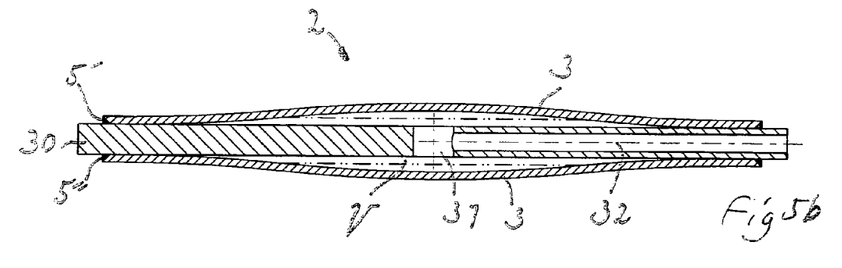

FIGS. 5a and 5b show an accumulator membrane unit according to an embodiment of the invention, wherein an accumulator membrane unit 2 which is comprised of two membrane element 3 that are vaulted in unpressurized state, as shown in the Figure, and one support disc 30. The membrane elements 3 are shown shaped identically and are each sealingly fastened to a respective side of the support disc 30 for forming the accumulator membrane unit 2. The membrane elements 3 and the accumulator membrane unit 2 are circular around the symmetry axis A and have a peripheral edge area wherein the membrane elements 3 lie essentially tangentially against the support disc. Peripherally most outwardly and directed radially outwardly are positioned weld joints 5' and 5", respectively, which sealingly joins the two membrane elements 3 most outwardly at their peripheries with the support disc 30 for forming a unit with a membrane volume V being sealingly limited against the surroundings.

31 indicates a channel (centrally) through the support disc 30 in order to allow gas communications between both sides of the support disc and the respective halves of the total membrane volume V. 32 indicates a channel which can be used to let the membrane volume V communicate with the surroundings outside the accumulator itself, with an atmosphere, a gas source or the like.

Figures 6, 7A:
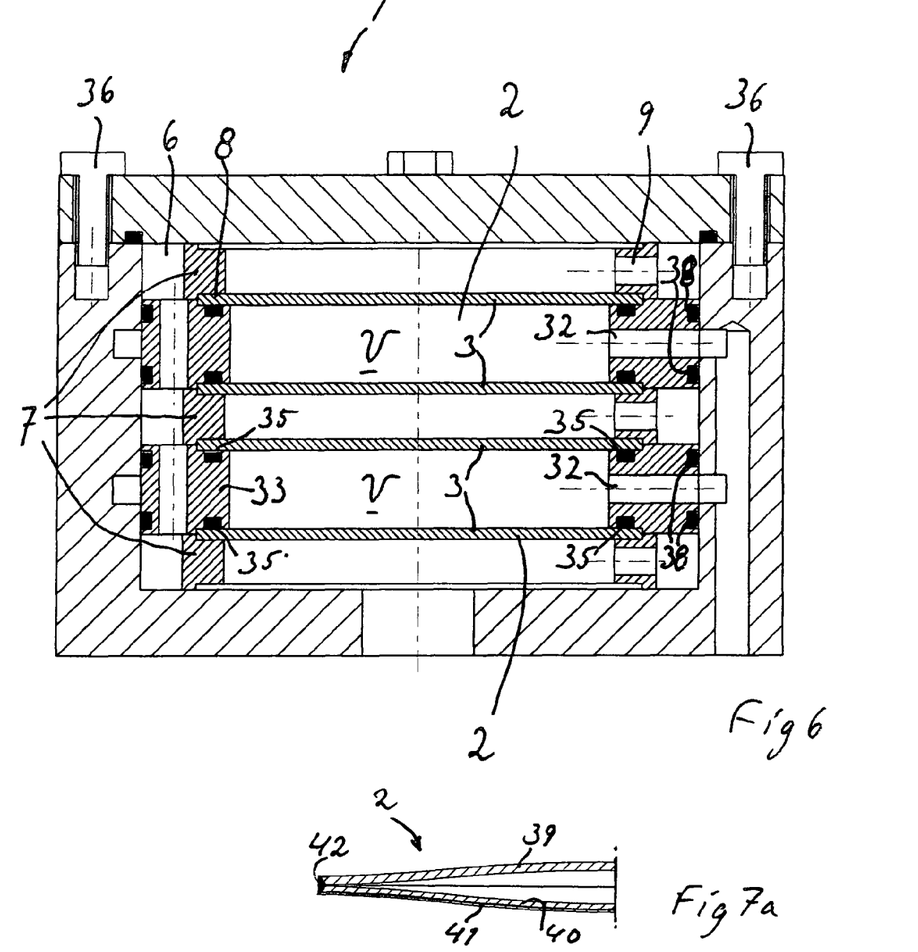
FIG. 6 shows in an axial section an accumulator according to a further embodiment of the invention.
FIGS. 7*a*, 7*b* and 7*c* show diagrammatically alternatively constructed accumulator membrane units according to the invention in axial part sections.

FIG. 6 shows in an axial section, an accumulator 1 according to a further embodiment of the invention. Two accumulator membrane units 2 are positioned and placed in the accumulator chamber 6 with the aid of an arrangement with a positioning device being comprised of a number of clamping rings 7, which are dimensioned such that they with respective recesses 8 partly receive an edge area of a respective membrane element 3. The clamping rings 7 are made from a material which is inert to hydraulic medium being inside the accumulator chamber at the temperatures that can prevail in the accumulator chamber 6.

The clamping rings 7 further have radial passages 9 allowing hydraulic medium to freely flow at the outside of accumulator membrane units 2 being positioned and fastened inside the accumulator chamber 6.

In this embodiment, the membrane units are flat in their initial position and an essentially disc shaped membrane volume V is hereby formed by the membrane elements being separated through a respective support ring 33. Sealing is achieved in this case through "clamping with intermediate sealing", that is clamping of the accumulator housing through screws 36 such that axial directed sealing rings 35 so as to achieve sealed membrane volumes V in respect of the rest of the accumulator chamber 6.

32 and 34 indicate a channel system that can be used to let the membrane volume V communicates with the surroundings, with the atmosphere, a gas source or the like. Sealing rings 38 are installed in order to seal off the channel system 32, 34 towards the rest of the accumulator chamber.

During use of an accumulator according to FIG. 6, a pressure increase inside the accumulator chamber 6 will result in a pressing-in or inward curving of the membrane elements such that the volume V is reduced, whereby the hydraulic energy is stored as elastic deformation energy in the membrane elements. When the pressure is released, the hydraulic energy is regained by the membrane elements springing back from a flat state.

A (not shown) connection for hydraulic medium hereby, according to the invention, communicates with a space in the accumulator chamber 6, which space is outside the membrane volumes for each accumulator membrane unit.

FIG. 7a shows a part of an accumulator membrane unit 2 having two membrane elements whereof one, 39, is comprised of a homogenous material and the second includes two material layers 40 and 41, which are intimately joined to each other. The membrane elements are joined to each other through a joint in the form of for example a weld 42, positioned in a more central portion of the accumulator membrane unit 2 relative to the solution in FIG. 2a.

Figure 7B:
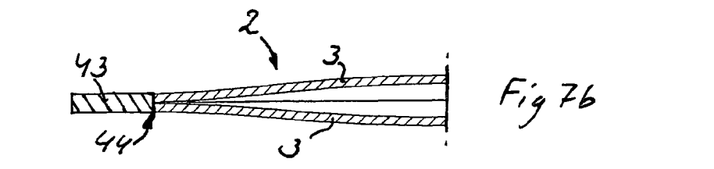

FIG. 7b shows a part of an accumulator membrane unit 2 with two membrane elements 3 being of the same material, thickness etc or being of two different materials. The membrane elements 3 are also in this case joined to each other through a joint in the form of for example a weld 42 positioned in a more central portion of the accumulator membrane unit 2 compared to the solution in FIG. 2a. One difference to this solution is that a peripheral ring-shaped support element 43 is arranged, at a radially inward surface of which the membrane elements 3 are joined with their radially outwardly facing edges through for example welding.

Figure 7C:
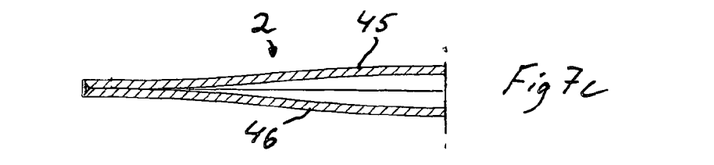

FIG. 7c shows a part of an accumulator membrane unit 2 having two membrane elements 45 and 46, from two different materials. The membrane elements 3 are in this case joined to each other through a joint in accordance with what is disclosed from FIG. 2a.

By varying the membrane elements in respect of their material according to what is indicated above with reference to FIGS. 7a-c and annexed text, the characteristic of the accumulator membrane unit can to a certain extent be adapted after demand. Such adaption has also to do with dimensioning of the accumulator.

The invention can be varied within the scope of the claims. The membrane elements can be sealingly joined together for forming an accumulator membrane unit in other ways than what is described and accumulators according to the invention can include from one accumulator membrane unit to a great number depending on the application. It is also possible through the invention to include, inside one and the same accumulator, accumulator membrane units having different working points $P_1$, $P_2$ ... $P_n$ and operating ranges $\Delta P_1$, $\Delta P_2$ ... $\Delta P_n$ such that through one and the same accumulator, a plurality of working points and operating ranges can be realised.

Accumulators according to the invention can work in and resist high pressures and are free from problems even at pressures exceeding 250 bar and also at frequencies above 100 Hz. For that reason they are particularly but not exclusively suitable as low pressure accumulators in applications otherwise periodically working with high pressures.

With "in unpressurized state" is intended a state for the membrane elements wherein they are unaffected by high pressure. Certainly the membrane elements shown in FIGS. 1-7 are vaulted also in some pressurized states. With vaulted is in the above intended the relation between "h" and "Φ" (see FIG. 2a) where Φ is the diameter between the points where the membrane elements are separated from each other.

The dimensions of an accumulator according to the invention can be varied after need and as desired. Curvature and thickness of the membrane elements can also be varied after the present requirement.

The invention claimed is:

1. Accumulator membrane unit for inclusion into an accumulator chamber in an accumulator for storing hydraulic energy under pressure, wherein
   the accumulator membrane unit includes membrane elements that are sealingly joined at their peripheries and limit an inside membrane volume which varies in dependence of a pressure at an outside of the accumulator membrane unit, and
   wherein the accumulator membrane elements are formed from at least one material arranged so that the membrane elements are elastically deformable during pressurizing with an increased hydraulic pressure of the accumulator membrane elements, wherein hydraulic energy is storable as elastic deformation energy in the membrane material itself of the membrane elements.

2. Accumulator membrane unit according to claim 1, wherein the membrane elements are made of a rigid but elastically deformable material.

3. Accumulator membrane unit according to claim 1, wherein
   the accumulator membrane unit forms a convex body in a non pressurized state.

4. Accumulator membrane unit according to claim 3, wherein the membrane elements have a vaulted shape such that the accumulator membrane unit is lens shaped in non pressurized state.

5. Accumulator for storing a hydraulic medium under pressure including a housing with a sealed connection for said hydraulic medium, wherein at least one accumulator membrane unit according to claim 1 is included inside the housing, and wherein the connection for hydraulic medium communicates with a space in an accumulator chamber inside the housing, which space is outside a membrane volume for each at least one accumulator membrane unit.

6. Accumulator according to claim 5, wherein it is provided with a positioning device for said at least one accumulator membrane unit.

7. Accumulator according to claim 6, wherein the positioning device includes clamping rings having axial and radial directions for holding the respective accumulator membrane unit in respect of the housing and at occasions relative to sideward positioned accumulator membrane unit(s).

8. Accumulator according to claim 7, wherein said clamping rings are provided with axially directed recesses for cooperation with a peripheral region of each accumulator membrane unit.

9. Accumulator according to claim 7, wherein said clamping rings are provided with at least one radial passage for hydraulic medium.

10. Accumulator according to claim 5, wherein inside one and the same accumulator a plurality of accumulator units having different working points and operating ranges are arranged such that with one and the same accumulator a plurality of working points and operating ranges are realized.

11. Accumulator according to claim 5, wherein the accumulator membrane unit limits a membrane volume which communicates with the outside of the accumulator.

12. Method for manufacturing an accumulator membrane unit for positioning inside an accumulator chamber in an accumulator for storing energy by means of hydraulic medium under pressure, wherein the accumulator membrane unit includes membrane elements that are joined together at their peripheries, and limit a membrane volume which is variable depending on a surrounding pressure,
wherein
   membrane elements are joined together for forming an accumulator membrane unit, which in unpressurized state is convex,
   wherein the accumulator membrane elements are formed from at least one material arranged so that the membrane elements are elastically deformable during pressurizing with an increased hydraulic pressure of the accumulator membrane elements,
   and wherein the membrane material of the membrane elements is chosen such that hydraulic energy is storable as elastic deformation energy in the membrane material itself.

13. Method according to claim 12, wherein the membrane elements are joined together through any one from the group: welding, soldering, clamping with intermediate sealing, gluing.

14. Method according to claim 13, wherein the membrane elements are joined together through welding, and
   wherein a radially outwardly directed weld joint is applied surrounding the accumulator membrane elements for joining the membrane elements.

15. Method according to claim 12,
   wherein two membrane elements that are vaulted in unpressurized state are positioned for forming a lens-shape,
   wherein the membrane elements are compressed by a pressing device to an essentially flat state, and
   wherein the membrane elements are joined together in this pressed together state.

16. Rock drilling machine including at least one accumulator according to claim 5.

17. Accumulator membrane unit according to claim 2,
   wherein the accumulator membrane unit forms a convex body in a non pressurized state.

18. Accumulator for storing a hydraulic medium under pressure including a housing with a sealed connection for said hydraulic medium, wherein at least one accumulator membrane unit according to claim 2 is included inside the housing, and wherein the connection for hydraulic medium communicates with a space in an accumulator chamber inside the housing, which space is outside a membrane volume for each at least one accumulator membrane unit.

19. Accumulator according to claim 8, wherein said clamping rings are provided with at least one radial passage for hydraulic medium.

20. Method according to claim 13,
   wherein two membrane elements that are vaulted in unpressurized state are positioned for forming a lens-shape,
   wherein the membrane elements are compressed by a pressing device to an essentially flat state, and
   wherein the membrane elements are joined together in this pressed together state.

* * * * *